(12) United States Patent
Cassandra et al.

(10) Patent No.: US 9,657,906 B1
(45) Date of Patent: May 23, 2017

(54) LIGHT-EMITTING DIODE RUNWAY END IDENTIFIER LIGHT SYSTEM

(71) Applicant: D M E Corporation, Orlando, FL (US)

(72) Inventors: Frank Cassandra, Lake Worth, FL (US); Sergio Bastiani, Fort Lauderdale, FL (US)

(73) Assignee: Astronics DME LLC, Ft. Lauderdale, FL (US)

( * ) Notice: Subject to any disclaimer, the term of this patent is extended or adjusted under 35 U.S.C. 154(b) by 171 days.

(21) Appl. No.: 14/559,902

(22) Filed: Dec. 3, 2014

Related U.S. Application Data

(60) Provisional application No. 61/911,290, filed on Dec. 3, 2013.

(51) Int. Cl.
| | |
|---|---|
| *F21S 8/00* | (2006.01) |
| *F21V 23/00* | (2015.01) |
| *H05B 33/08* | (2006.01) |
| *F21W 111/06* | (2006.01) |
| *F21Y 115/10* | (2016.01) |
| *F21Y 109/00* | (2016.01) |

(52) U.S. Cl.
CPC ............ *F21S 8/032* (2013.01); *F21V 23/008* (2013.01); *H05B 33/089* (2013.01); *H05B 33/0851* (2013.01); *B64D 2203/00* (2013.01); *F21W 2111/06* (2013.01); *F21Y 2109/00* (2016.08); *F21Y 2115/10* (2016.08)

(58) Field of Classification Search
CPC .... B64D 2203/00; F21S 8/032; F21V 23/008; F21Y 2109/00; F21Y 2115/10; F21W 2111/06; H05B 33/089; H05B 33/0851
USPC ................................................ 362/153.1, 470
See application file for complete search history.

(56) References Cited

U.S. PATENT DOCUMENTS 6,676,284 B1 * 1/2004 Wynne Willson ...... F21S 8/032
362/231

* cited by examiner

*Primary Examiner* — Stephen F Husar
(74) *Attorney, Agent, or Firm* — Hodgson Russ LLP

(57) ABSTRACT

Runway end identifier light system having a housing with an illumination window, a substrate having a mounting surface disposed within the housing, and a first light-emitting diode ("LED") disposed on the mounting surface of the substrate. The LED may be configured such that light emitted by the LED is visible through the illumination window of the housing. The LED may have a primary illumination axis which is at an angle greater than 0° with respect to a perpendicular axis of the substrate. Systems with multiple mounting surfaces and multiple LEDs having various primary illumination axes are disclosed.

19 Claims, 5 Drawing Sheets

LIGHT-EMITTING DIODE RUNWAY END IDENTIFIER LIGHT SYSTEM

CROSS-REFERENCE TO RELATED APPLICATIONS

This application claims priority to U.S. Provisional Application No. 61/911,290, filed on Dec. 3, 2013, the disclosure of which is incorporated herein by reference.

FIELD OF THE INVENTION

The disclosure relates to lighting systems used for aircraft, and more particularly to runway end identifier lights.

BACKGROUND OF THE INVENTION

Identification of the end of an airport runway is an important safety concern, especially when one considers the large numbers of lights and lighting systems located in the vicinity of airports and runways. Additionally, lights identifying the ends of runways are important where runways lack contrast with the surrounding terrain, where reduced visibility are a concern due to, for example, poor weather conditions, where a runway threshold is displaced from the runway extremity, and other reasons.

Runway end identifier lights ("REILs") are installed at many airports to provide identification of the approach end of the runways located at such airports. REIL systems may include of a pair of synchronized flashing lights located on each side of the runway threshold. REILs may be either omnidirectional or unidirectional facing the approach area.

Traditional REIL utilize xenon or other types of illumination due to the requirement of high-visibility—e.g., REILs should have a range of approximately 3 miles during the daytime, and 20 miles at night. However, such traditional lights can create a hazard when the light source reaches its end-of-life. Accordingly, there is a need for a REIL system having a longer lifetime and including redundancy.

BRIEF SUMMARY OF THE INVENTION

One embodiment of the present invention can be described as a runway end identifier light ("REIL") system comprising a housing, a substrate, and a first light-emitting diode ("LED"). The housing may have an illumination window.

The substrate may be disposed within the housing, The substrate may have a mounting surface. In one embodiment, the substrate may comprise a bezel surface. The bezel surface may be configured to radiate heat produced by the LED towards the illumination window.

The first LED may be disposed on the mounting surface of the substrate. The first LED may be configured such that light emitted by the LED is visible through the illumination window of the housing. The LED may have a primary illumination axis. The primary illumination axis may be at an angle greater than 0° with respect to a perpendicular axis of the substrate. The LED may be configured to illuminate with a first intensity, a second intensity greater than the first intensity, or a third intensity greater than the second intensity.

In one embodiment, the system may further comprise an additional LED disposed on the mounting surface of the substrate and having a primary illumination axis different from the primary illumination axis of the first LED, and which is at an angle greater than 0° from a perpendicular axis of the substrate.

In another embodiment, the REIL system may further comprise a control cabinet enclosing an input device and an output device for controlling the LED.

In one embodiment, the substrate may have multiple mounting surfaces. In such an embodiment, the system may comprise multiple LEDs disposed on each of the multiple mounting surfaces of the substrate. The LEDs may be arranged in a series circuit. The LEDs may be configured such that light emitted by each LED is visible through the illumination window of the housing. Each LED may have a primary illumination axis which is at an angle greater than 0° with respect to a perpendicular axis of the substrate. In another embodiment, the primary illumination axis of one of the LEDs may different from the primary illumination axis of another of the LEDs. In one embodiment, the primary illumination axis of each of the LEDs is different than the primary illumination axis of all the other LEDs.

In one embodiment, the system may further comprise an LED driver circuit. The LED driver circuit is in electrical communication with the first LED. The LED driver circuit is configured to provide a pulse-width modulated power signal to the LED. In another embodiment, the system may further comprise an intensity detection circuit. The intensity detection circuit may be configured to determine an illumination intensity of the LED based on a received control signal. The intensity detection circuit may further be configured to emit an intensity control signal. In one embodiment, the system further comprises an output pulse width intensity circuit. The output pulse width intensity circuit is configured to receive the intensity control signal from the intensity detection circuit. The output pulse width intensity circuit may be further configured to generate a corresponding intensity pulse width and send the intensity pulse width to the LED driver circuit.

In another embodiment, the system further comprises an LED failure detection circuit configured to detect failure of the LED and generate a failure signal based on a predetermined failure condition.

DESCRIPTION OF THE DRAWINGS

For a fuller understanding of the nature and objects of the invention, reference should be made to the following detailed description taken in conjunction with the accompanying drawings, in which.

DETAILED DESCRIPTION OF THE INVENTION

Figure 1:
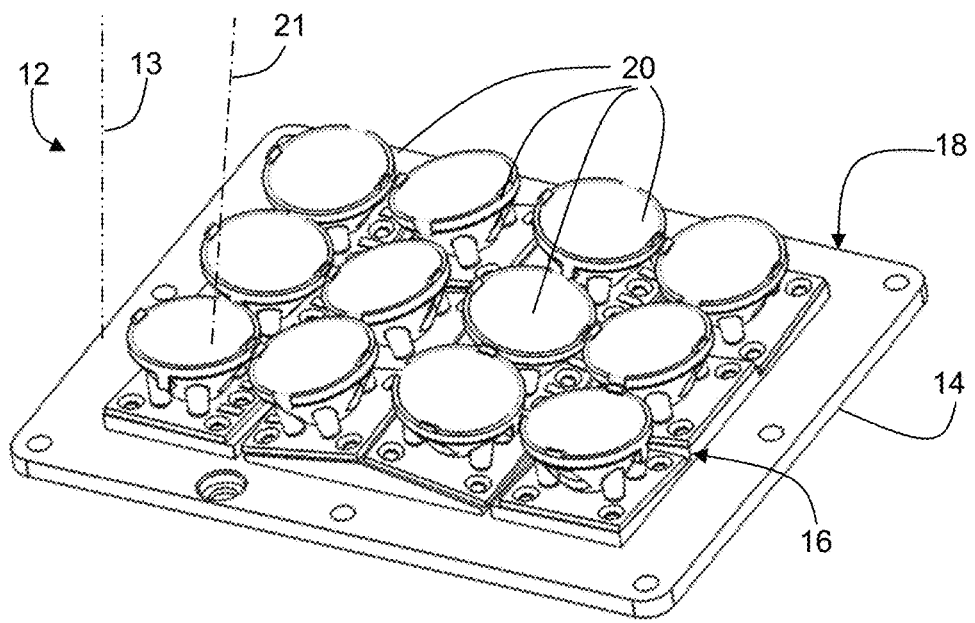
FIG. 1 is a perspective view of a portion of an illumination module according to an embodiment of the present disclosure.
Figure 2:
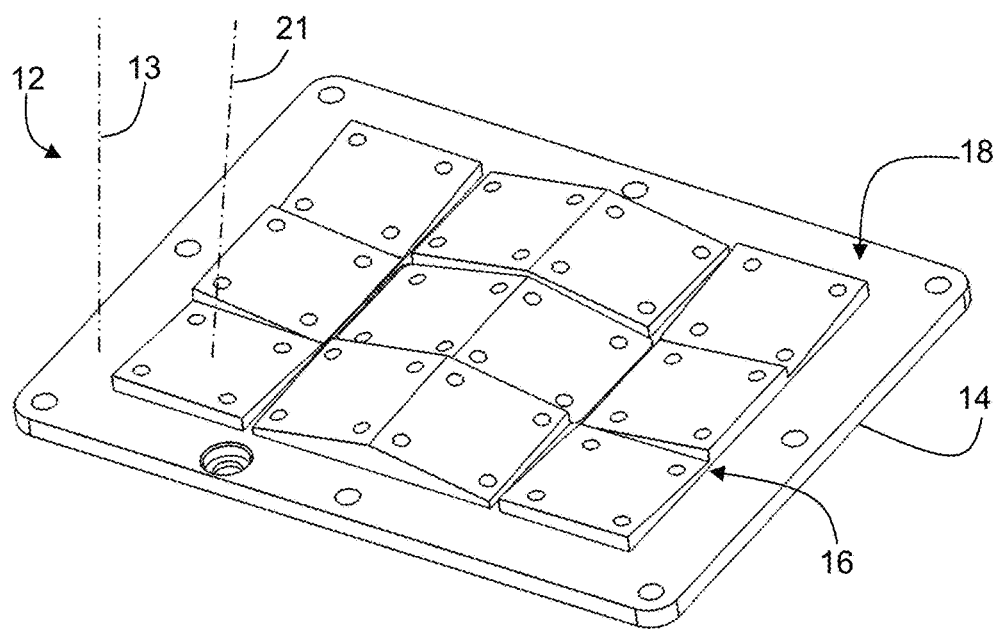
FIG. 2 is a perspective view of the portion of an illumination module in FIG. 1 without LEDs shown.
Figure 3:
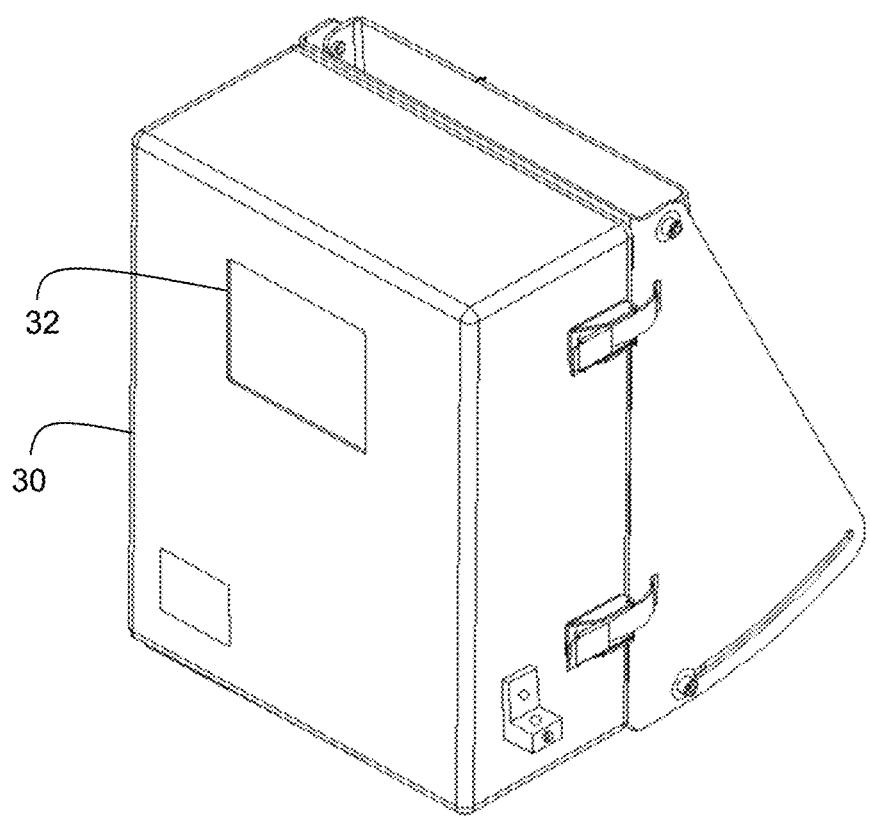
FIG. 3 is a perspective view of a REIL IUA (Identifier Unit Assembly) housing according to an embodiment of the present disclosure.

The present disclosure may be embodied as a runway end identifier light ("REIL") system 10. The REIL system has an identifier unit LED Assembly 12. The LED Assembly 12 comprises a substrate 14 and two or more LEDs 20 mounted on a mounting surface 16 of the substrate 14. Each LED 20 may be mounted to the substrate at an angle, such that a primary illumination axis of each LED 20 is not perpendicular to the substrate 14. The angle between the primary illumination axis 21 of any particular LED 20 and a perpendicular axis 13 of the substrate 14 may be low (e.g., ranging from less than 1° to 30° or any values in between), such that the REIL system 10 may be effectively unidirectional. The mounting surface 16 may be parallel to the substrate 14 or at an angle with respect to a plane of the substrate 14. In other embodiments, the REIL system 10 is not unidirectional. The REIL system 10 may be configured to be omnidirectional. In some embodiments, the primary illumination axis of an LED 20 is the axis on which light is provided at the highest intensity.

The identifier LED Assembly 12 may be enclosed in a housing 30, and, in such embodiments, the housing 30 may have an illumination window 32 such that light from the LED Assembly 12 is transmitted through the illumination window 32 of the housing 30. The LED Assembly 12 and housing 30 may be referred to as an "identifier unit assembly."

In some embodiments, the substrate 14 is configured to be a heat-sink such that heat generated by the LEDs 20 is dissipated into the ambient environment by the substrate 14. In some embodiments, the substrate 14 may be configured to cause such sunk heat to be directed to the illumination window 32 of the housing 30, or any other protective covering. For example, the substrate may comprise a bezel surface 18. As such, heat produced by the LEDs 20 may advantageously be used to prevent snow, ice, frost, condensation, or other environmental effects from reducing the visibility of the REIL system 10.

In an exemplary embodiment depicted in FIG. 1, the identifier LED Assembly unit 12 comprises twelve single-die LEDs 20. In one embodiment, the LEDs 20 may be configured to emit white light. The LEDs 20 may be configured to emit different colors of light, such as blue, red, or green. In one embodiment, the LEDs 20 may be capable of selectively emitting various colors.

Each LED 20 may be disposed at an angle with respect to the substrate 14. The pattern produced by the LEDs 20 of the LED Assembly 12 may be controlled by varying the placement of the LEDs 20. In some embodiments, more than one LED 20 may be disposed at the same angle with respect to the mounting surface 16 of the substrate 14. In this way, the REIL system 10 may incorporate redundancy to account for LED 20 end-of-life and/or the effective range of the REIL system 10 may be increased.

Figure 4A:
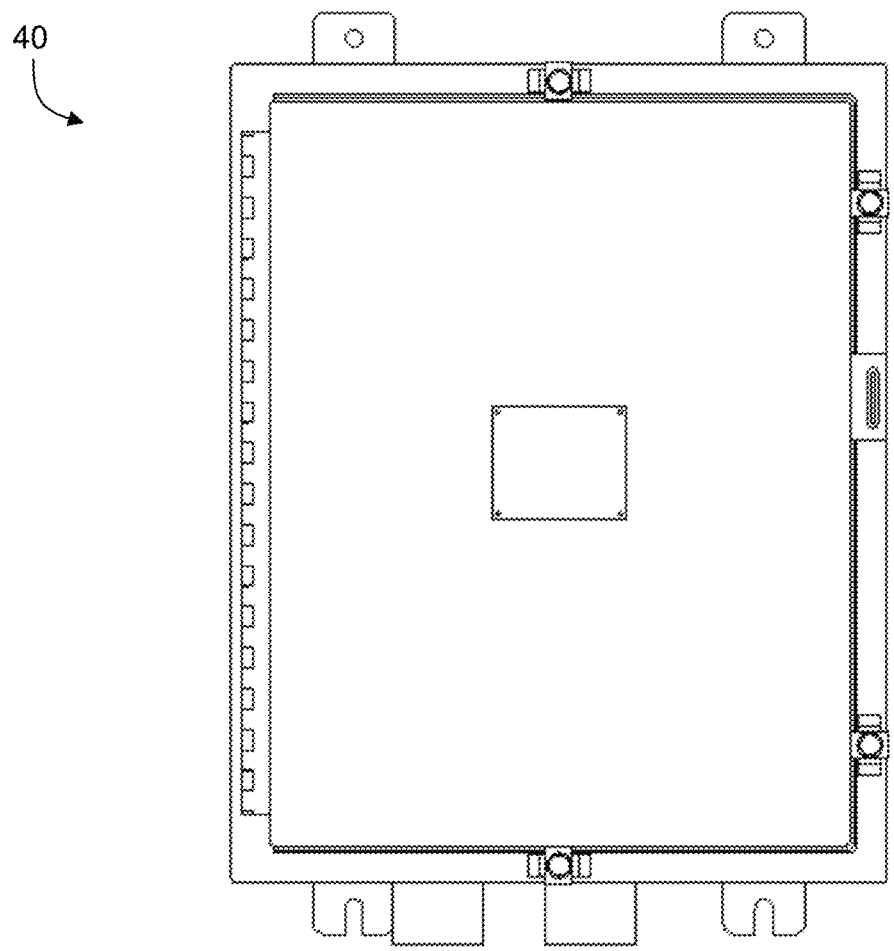
FIG. 4A is a front elevation view of a control cabinet of a REIL system according to another embodiment of the present disclosure.
Figure 4B:
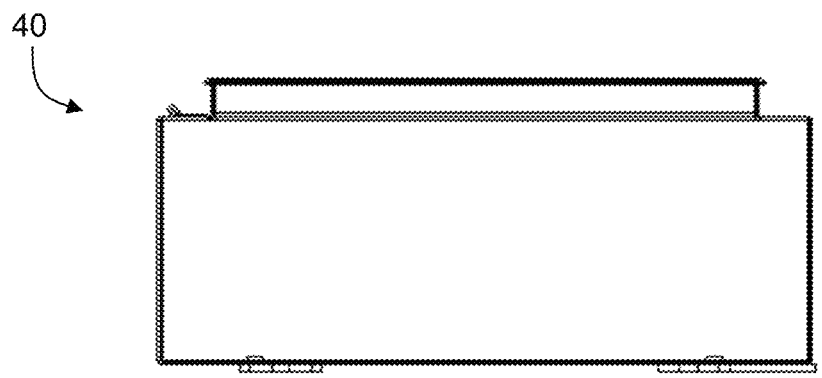
FIG. 4B is a bottom view of the control cabinet of FIG. 3A.
Figure 5:
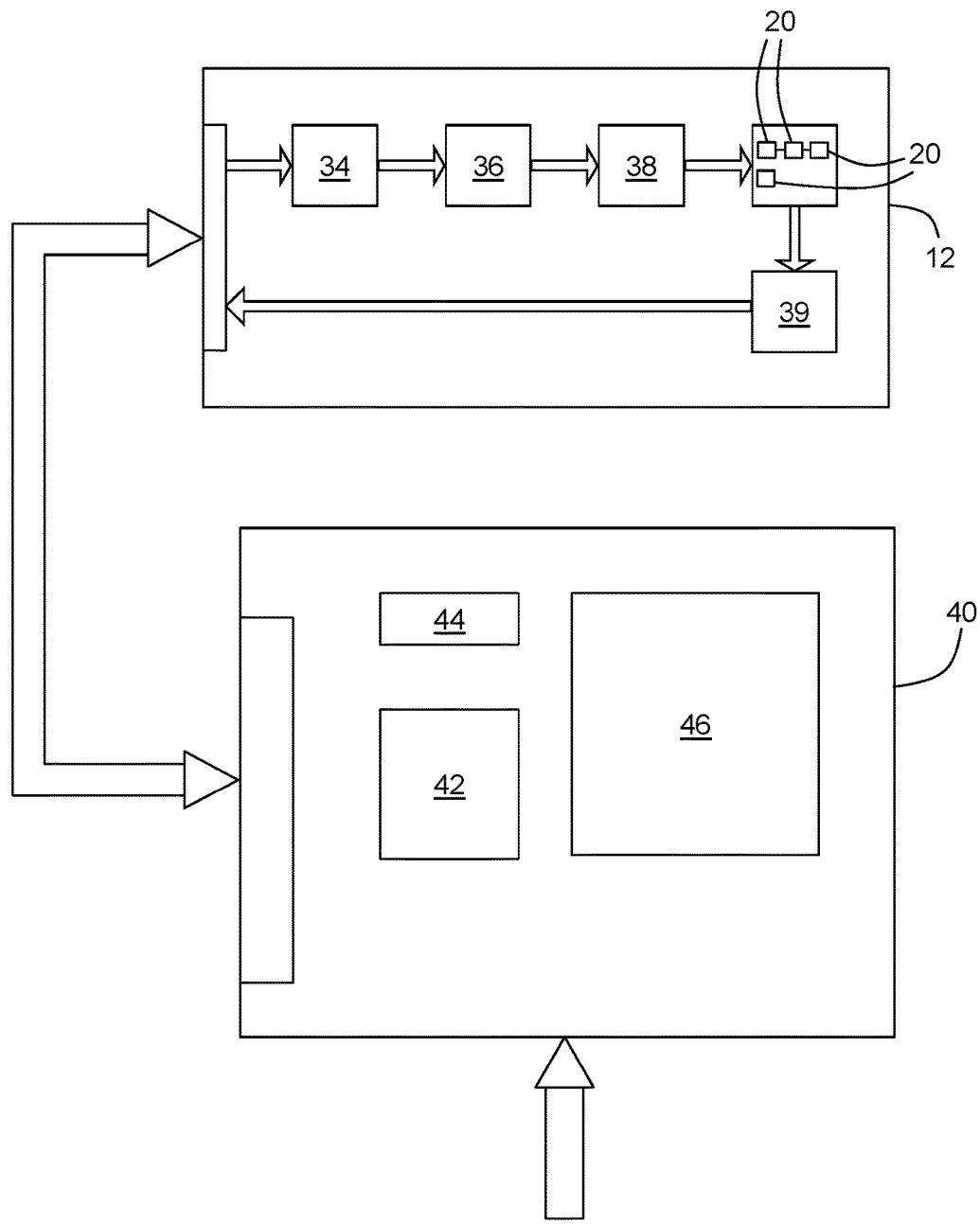
FIG. 5 is a block diagram of a REIL system according to an embodiment of the present disclosure.
Figure 6:
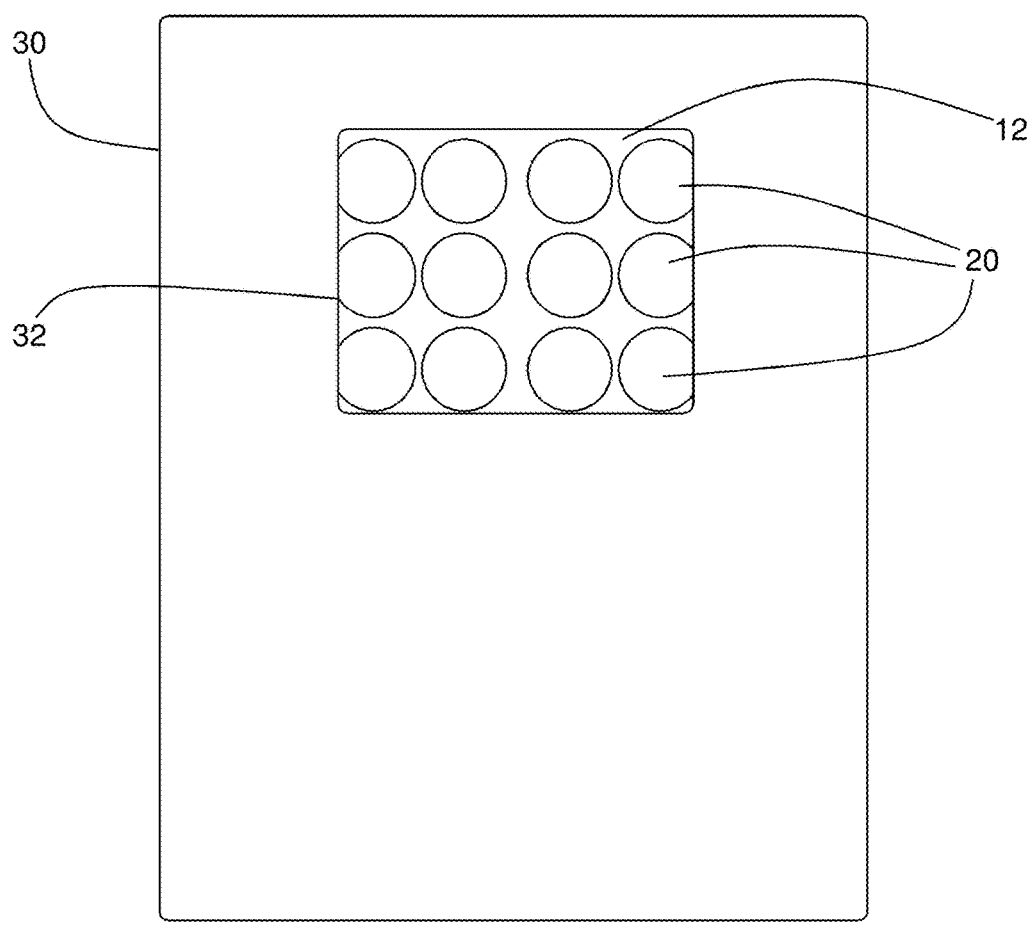
FIG. 6 is a front elevation view of a REIL IUA (Identifier Unit Assembly) system according to another embodiment of the present disclosure.

The LED Assembly 12 may further comprise an LED driver circuit 38 in electrical communication with the LEDs 20, and configured to provide a pulse-width modulated power signal to the LEDs 20 (see, e.g., FIG. 4). The LEDs 20 may be arranged in a series circuit driven by current from the LED driver circuit 38.

An intensity detection circuit 34 is provided for determining whether the LEDs 20 should be configured for low, medium, or high intensity illumination based on a received control signal, and sending an intensity control signal. The intensity detection circuit 34 may determine whether the LEDs 20 should be configured for low, medium, or high intensity illumination based on governmental requirements. Other requirements may be used, for example, military requirements or user-defined requirements.

An output pulse width intensity circuit 36 is configured to receive the intensity control signal from the input intensity detection circuit 34, generate the corresponding intensity pulse width, and send the pulse width to the LED driver circuit 38. The LED Assembly 12 may further comprise an LED failure detection circuit 39 configured to detect failure of one or more LEDs 20 and generate a failure signal upon pre-determined failure conditions (e.g., failure of an LED 20, failure of more than 25% of the LEDs 20, etc.)

The REIL system 10 may further comprise a control cabinet 40 to house control electronics. The control electronics of the REIL system 10 may comprise an input device 42, such as, for example, a keypad, configured to allow control of the REIL system 10 by an operator. The control electronics may further comprise an output device 44, such as, for example, a vacuum fluorescent display, configured to display information. Other output devices, such as an LCD, OLED, or LED display maybe used. An input detection and output control circuit 46 may determine a control mode of the REIL system 10. For example, the REIL system 10 may be configured for control via operator input at the input device 42, remote control via air-to-ground communication (e.g., pilot controlled, etc.) or ground-to-ground communication (e.g., tower, etc.); and/or automatic control (e.g., detecting state of other airfield lighting via a control loop, etc.) The input detection and output control circuit 46 may be configured to provide a control signal to the LED Assembly 12 to control the state of illumination of the LEDs 20 (e.g., on, off, low, medium, high, etc.)

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A runway end identifier light ("REIL") system, comprising:
   a housing having an illumination window;
   a substrate disposed within the housing; the substrate having a mounting surface;
   a first light-emitting diode ("LED") disposed on the mounting surface of the substrate and configured such that light emitted by the LED is visible through the illumination window of the housing; the LED having a primary illumination axis which is at an angle greater than 0° with respect to a perpendicular axis of the substrate; and
   an additional LED disposed on the mounting surface of the substrate and having a primary illumination axis different from the primary illumination axis of the first LED, and which is at an angle greater than 0° from a perpendicular axis of the substrate.

2. The REIL system of claim 1, wherein the LED is configured to illuminate with a first intensity, a second intensity greater than the first intensity, or a third intensity greater than the second intensity.

3. The REIL system of claim 1, wherein the substrate comprises a bezel surface, and the bezel surface is configured to radiate heat produced by the LED towards the illumination window.

4. The REIL system of claim 1, further comprising a control cabinet enclosing an input device and an output device for controlling the LED.

5. The REIL system of claim 1, wherein the substrate has multiple mounting surfaces, the system further comprising LEDs disposed on each of the multiple mounting surfaces of the substrate and configured such that light emitted by each LED is visible through the illumination window of the housing, each LED having a primary illumination axis which is at an angle greater than 0° with respect to a perpendicular axis of the substrate.

6. The REIL system of claim 5, wherein the primary illumination axis of one of the LEDs is different from the primary illumination axis of another of the LEDs.

7. The REIL system of claim 5, wherein the primary illumination axis of each of the LEDs is different than the primary illumination axis of all the other LEDs.

8. The REIL system of claim 5, wherein the LEDs are arranged in a series circuit.

9. The REIL system of claim 1, further comprising an LED driver circuit in electrical communication with the first LED, the LED driver circuit configured to provide a pulse-width modulated power signal to the first LED.

10. The REIL system of claim 9, further comprising an intensity detection circuit configured to determine an illumination intensity of the LED based on a received control signal, the intensity detection circuit further configured to emit an intensity control signal.

11. The REIL system of claim 10, further comprising an output pulse width intensity circuit configured to receive the intensity control signal from the intensity detection circuit, the output pulse width intensity circuit further configured to generate a corresponding intensity pulse width and send the intensity pulse width to the LED driver circuit.

12. The REIL system of claim 1, further comprising an LED failure detection circuit configured to detect failure of the LED and generate a failure signal based on a predetermined failure condition.

13. A REIL system, comprising:
a housing having an illumination window;
a substrate disposed within the housing; the substrate having a mounting surface;
a first LED disposed on the mounting surface of the substrate and configured such that light emitted by the LED is visible through the illumination window of the housing; the LED having a primary illumination axis which is at an angle greater than 0° with respect to a perpendicular axis of the substrate; and
wherein the substrate comprises a bezel surface, and the bezel surface is configured to radiate heat produced by the LED towards the illumination window.

14. A REIL system, comprising:
a housing having an illumination window;
a substrate disposed within the housing; the substrate having a mounting surface;
a first LED disposed on the mounting surface of the substrate and configured such that light emitted by the LED is visible through the illumination window of the housing; the LED having a primary illumination axis which is at an angle greater than 0° with respect to a perpendicular axis of the substrate;
wherein the substrate has multiple mounting surfaces, the system further comprising LEDs disposed on each of the multiple mounting surfaces of the substrate and configured such that light emitted by each LED is visible through the illumination window of the housing, each LED having a primary illumination axis which is at an angle greater than 0° with respect to a perpendicular axis of the substrate; and
wherein the primary illumination axis of one of the LEDs is different from the primary illumination axis of another of the LEDs.

15. The REIL system of claim 14, wherein the primary illumination axis of each of the LEDs is different than the primary illumination axis of all the other LEDs.

16. The REIL system of claim 14, wherein the LEDs are arranged in a series circuit.

17. A REIL system, comprising:
a housing having an illumination window;
a substrate disposed within the housing; the substrate having a mounting surface;
a first LED disposed on the mounting surface of the substrate and configured such that light emitted by the LED is visible through the illumination window of the housing; the LED having a primary illumination axis which is at an angle greater than 0° with respect to a perpendicular axis of the substrate;
an LED driver circuit in electrical communication with the first LED, the LED driver circuit configured to provide a pulse-width modulated power signal to the first LED; and
an intensity detection circuit configured to determine an illumination intensity of the LED based on a received control signal, the intensity detection circuit further configured to emit an intensity control signal.

18. The REIL system of claim 17, further comprising an output pulse width intensity circuit configured to receive the intensity control signal from the intensity detection circuit, the output pulse width intensity circuit further configured to generate a corresponding intensity pulse width and send the intensity pulse width to the LED driver circuit.

19. The REIL system of claim 17, further comprising an LED failure detection circuit configured to detect failure of the LED and generate a failure signal based on a predetermined failure condition.

* * * * *